2,315,424

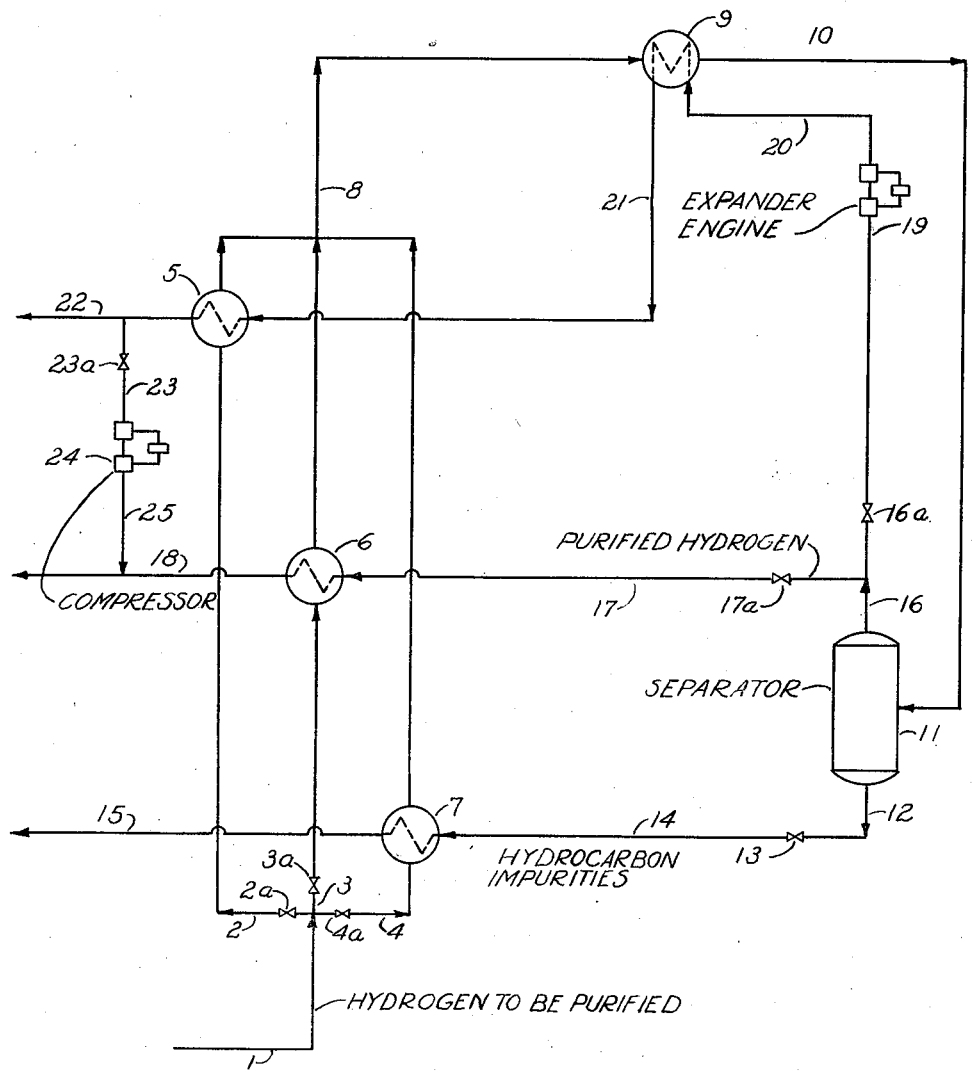
March 30, 1943. L. R. HILL ET AL 2,315,424
HYDROGEN PURIFICATION
Filed July 17, 1941
LUTHER R. HILL
GREGORY A. VINCENT
EVERETT W. HOWARD
INVENTORS
BY E. T. Liebrecht
ATTORNEY Patented Mar. 30, 1943

UNITED STATES PATENT OFFICE 2,315,424

HYDROGEN PURIFICATION

Luther R. Hill, Radburn, Gregory A. Vincent, Teaneck, and Everett W. Howard, Glen Rock, N. J., assignors to The M. W. Kellogg Company, Jersey City, N. J., a corporation of Delaware Application July 17, 1941, Serial No. 402,806

4 Claims. (Cl. 62—175.5)

This invention relates to hydrogen purification and more particularly to a process for purifying hydrogen containing light hydrocarbons as impurities.

Although not limited thereto, our invention may be applied with particular advantage to the purification of the hydrogen-bearing by-product gas which is produced in certain catalytic hydrocarbon dehydrogenation processes. In catalytic dehydro-aromatization particularly it is found that the activity of the catalyst is greatly prolonged and the quality of the products is improved if by-product hydrogen is recycled to the catalytic conversion zone with hydrocarbons to be aromatized. With some feed stocks the by-product hydrogen is sufficiently pure for recycling without any further purification, but with others and particularly when aromatizing cracked or unsaturated naphthas, purification of the by-product hydrogen to be recycled confers decided advantages.

One of the objects of our invention is to provide a hydrogen purification process wherein the removal of hydrocarbon impurities is effected by condensation thereof at an elevated pressure and at a relatively low sub-atmospheric temperature.

Another object of our invention is to provide a process of the latter type wherein cooling and condensation of hydrocarbon impurities is effected with a relatively small consumption of power for refrigeration.

Still another object of our invention is to provide a method of purifying by-product hydrogen produced by and desired to be recycled to a catalytic aromatization process, wherein excess by-product hydrogen over and above the quantity required for recycling is utilized to provide the refrigeration necessary for cooling and condensing hydrocarbon impurities from the hydrogen to be recycled. Other objects and advantages of the invention will appear during the course of the description hereinafter given.

It is contemplated by the invention to cool a mixture of hydrogen and light hydrocarbons under an elevated super-atmospheric pressure, and to condense out a substantial proportion of the hydrocarbons. Cold liquefied hydrocarbons thus condensed are separated and used to cool additional quantities of the feed gas mixture by indirect heat exchange, and the cold purified hydrogen is similarly used, a portion being first expanded to a lower pressure in a work engine to reduce its temperature even further.

The invention here involved is capable of a variety of exemplifications, one of which, for the purpose of illustrating the invention, is shown in the accompanying drawing as a diagrammatic flow sheet. Referring now to the drawing for a description of a preferred embodiment of the invention, a stream of hydrogen-bearing gas to be purified is introduced under a relatively high super-atmospheric pressure into line 1 and divided into three portions which are passed through lines 2, 3 and 4, the respective amounts being controlled by means of valves 2a, 3a, and 4a. The portion introduced into line 2 is cooled in a heat exchanger 5 to a relatively low sub-atmospheric temperature, while the portions introduced into lines 3 and 4 are cooled to substantially the same low temperature in heat exchangers 6 and 7 respectively. After being cooled the three gas streams are recombined in line 8 and cooled further in heat exchanger 9. At the low temperature thus attained, a substantial proportion of the hydrocarbon impurities in the gas are condensed, and a mixture of gas and condensate is withdrawn from exchanger 9 and passed through line 10 into a separating drum 11, wherein disengagement of liquid and gaseous phases takes place.

Cold condensed hydrocarbons are withdrawn from the base of separator 11 through line 12, and undergo a substantial reduction in pressure in passing through a pressure-reduction valve 13. They then pass through line 14 to the heat exchanger 7 wherein they cool one of the three portions of the incoming gas stream, and are simultaneously vaporized at least in part by the heat which is transferred to them. From heat exchanger 7 the removed hydrocarbon impurities are disposed of through line 15 as desired.

Cold purified hydrogen is withdrawn from the top of separator 11 through line 16. The major portion of the thus-withdrawn gas is diverted through line 17 and valve 17a to heat exchanger 6, wherein it cools one portion of the incoming gas stream. Thereafter the diverted portion constituting the desired product of the purification process, is passed through line 18 and disposed of as desired. It will be observed that this product gas is available at the high pressure required by the purification step.

The remaining portion of the purified hydrogen withdrawn from separator 11 continues through line 16 and valve 16a to an expander engine of any suitable type, such as a reciprocating or turbo expander 19, wherein it is allowed to do work and is reduced in pressure to a considerable extent. As a result of the auto-refrigerative effect it undergoes a marked lowering in temperature, and is passed through line 20 to heat exchanger 9 wherein it cools the recombined incoming feed gas. After performing this cooling duty it passes through line 21 to heat exchanger 5 wherein it is used in cooling one of the three streams into which the incoming feed gas has temporarily been divided. Thereafter it is disposed of as desired through line 22.

It will be seen that the described process produces purified hydrogen at two different pressures, and that the expansion of one portion of the product gas from the higher to the lower pressure is the source of the refrigeration which is used and re-used to effect purification. Accordingly, the refrigeration requirements of the process determine the proportion of the purified hydrogen which must be expanded. If it is necessary or advantageous to do so, we may provide greater amounts of purified hydrogen at the higher pressure by passing part of the low-pressure product gas from line 22 through line 23 and valve 23a to a recompressor 24, which raises it to its original pressure, and combining the recompressed gas with the unexpanded stream in line 18 via line 25. Power generated by the expander engine 19 may be used in driving the recompressor 24 if desired.

As stated previously, our invention may be practiced to advantage in connection with the catalytic dehydro-aromatization of hydrocarbon naphthas, particularly those of a cracked or unsaturated character. In one such process naphtha is converted at a pressure of 350 pounds per square inch in the presence of recycled hydrogen which should preferably be 75% pure or better. The by-product gas contains hydrogen in amounts corresponding to a net hydrogen production varying from as low as 50 to more than 200 cubic feet per barrel of naphtha converted, depending upon the type of naphtha and the extent of the conversion. However, the by-product gas as initially separated has a hydrogen content which is frequently below 50%, so that extensive purification is necessary prior to recycling.

In applying our invention to a situation such as the one outlined, the heaviest hydrocarbon impurities may if desired be removed from the by-product gas by conventional absorption methods, and the method of our invention reserved as the final stage of purification.

Our invention preferably employs pressures between about 200 and 500 pounds per square inch. Although the feed stock to a catalytic dehydro-aromatization process is usually charged at pressures of 300 to 400 pounds per square inch and even higher, the by-product gas is usually released at considerably lower pressure because of unavoidable pressure drop through the heating, conversion and preliminary product separation equipment so that impure by-product hydrogen which is to be treated in accordance with the invention will usually have to be compressed somewhat before purification. It is advantageous to carry out the purification at a pressure within the range previously specified that will permit direct transfer of recycle purified hydrogen to the catalytic conversion zone without any further recompression.

An example will now be given illustrating the application of our invention to the purification of by-product hydrogen derived from catalytic naphtha dehydro-arromatization process.

Suitable operating conditions and exemplary stream compositions will be given for the embodiment of the invention already described, in order to indicate the results capable of being achieved thereby.

A by-product gas derived from a catalytic dehydro-aromatization process had the following composition:

|  | Mols per hour | Mol percent |
|---|---|---|
| Hydrogen | 1374.6 | 61.8 |
| Methane | 550.2 | 24.6 |
| Ethane | 150.5 | 6.8 |
| Propane | 76.8 | 3.5 |
| Butane and heavier | 73.6 | 3.3 |
| Total | 2216.7 | 100.0 |

This gas after having been dried and compressed to a pressure of 350 pounds per square inch absolute, was introduced at a temperature of 95° F. into line 1 for purification. The gas was divided into three portions and supplied to heat exchangers 5, 6 and 7 in the following amounts:

Exchanger 5 received 256 mols per hour,
Exchanger 6 received 744 mols per hour, and
Exchanger 7 received 1217 mols per hour.

Each of the three streams was cooled in its respective heat exchanger from 95° F. to −155° F. and the recombined streams were cooled in exchanger 9 to −165° F. At this low temperature hydrocarbons were condensed from the gas in the following amounts:

|  | Mols per hour |
|---|---|
| Methane | 127.7 |
| Ethane | 124.0 |
| Propane | 75.6 |
| Butane and heavier | 64.6 |
| Total | 384.9 |

Disengagement of condensate took place in separator 11 and the uncondensed gas, constituting the desired hydrogen of increased purity, contained the following amounts of constituents:

|  | Mols per hour | Mol percent |
|---|---|---|
| Hydrogen | 1374.6 | 75.0 |
| Methane | 429.5 | 23.5 |
| Ethane | 26.5 | 1.4 |
| Propane | 1.2 | 0.1 |
| Total | 1831.8 | 100.0 |

The condensate was withdrawn from separator 11 and passed to heat exchanger 7, and in cooling one portion of the incoming gas stream from 95° F. to −155° F. was completely vaporized and warmed to a temperature of 85° F.

Of the purified hydrogen withdrawn from separator 11 through line 16, 1350 mols per hour were used to cool one portion of the incoming gas stream in exchanger 6 from 95° F. to −155° F., meanwhile being itself heated to 85° F.

The remaining portion of the purified hydrogen, amounting to 482 mols per hour, was passed through expander engine 19 and expanded to a pressure of 50 pounds per square inch whereupon it underwent a lowering in temperature to −275° F. In passing through heat exchanger 9 and cooling the incoming gas stream from −155° F. to −165° F. it was itself warmed to −165° F. and in effecting further cooling of one portion of the incoming gas stream from 95° F. to −155° F. in exchanger 5 was warmed to 85° F.

The catalytic naphtha dehydro-aromatization process from which the by-product feed gas to the purification system was derived operated at 350 pounds pressure and required 1650 mols per hour of recycle hydrogen. As will be seen, the necessary expansion of 482 mols for refrigerating purposes left only 1350 mols available at a pressure high enough for immediate transfer to the conversion operation. In order to make up this deficiency, 300 mols per hour of hydrogen was withdrawn from the 50 pound pressure stream traversing line 22 and compressed up to 350 pounds in the recompressor, after which it was combined with the main high pressure stream in line 18. This left 182 mols per hour to be rejected from the process.

It will be understood that in view of the different cooling capacities of the cold condensed hydrocarbon stream and the two cold purified hydrogen streams, it is necessary to supply different amounts of feed gas to the three preliminary cooling exchanges 5, 6 and 7 if the cooling capacity of each stream is to be utilized to the fullest extent. The three precooled streams should be re-united at a common low temperature and the three coolant streams should be released at a common high temperature for maximum heat exchange efficiency.

It will be evident from the preceding description and illustration that our invention provides an efficient and economical method of purifying hydrogen by low temperature-high pressure condensation of hydrocarbon impurities, particularly when practiced in connection with a high pressure catalytic dehydro-aromatization process. The net make gas from such a process, which need not be maintained at the high pressure of the purification procedure, is expanded to a low pressure and thus provides a substantial portion of the refrigeration necessary for the purification.

We claim:

1. A method of purifying hydrogen of light hydrocarbon impurities which comprises cooling hydrogen contaminated with light hydrocarbons under super-atmospheric pressure to condense some of said light hydrocarbons, separating the thus-condensed cold hydrocarbons from cold purified hydrogen, reducing the pressure on the cold separated hydrocarbons and using them to cool additional quantities of said contaminated hydrogen by indirect heat exchange therewith, using a portion of said cold purified hydrogen to cool additional quantities of said contaminated hydrogen, expanding another portion of said cold purified hydrogen to lower further the temperature thereof, and using the expanded colder purified hydrogen to cool additional quantities of said contaminated hydrogen.

2. A method of purifying hydrogen of light hydrocarbon impurities which comprises passing a stream of impure hydrogen under super-atmospheric pressure first through three heat exchangers in parallel and then through a final heat exchanger to cool said impure hydrogen, condense hydrocarbons therefrom, and substantially increase the purity thereof, separating cold condensed hydrocarbons from purified hydrogen and using said hydrocarbons to cool one portion of said impure hydrogen stream in one of said parallel exchangers, using a portion of said cold purified hydrogen to cool another portion of said stream in another of said parallel heat exchangers, expanding another portion of said cold purified hydrogen to lower further the temperature thereof, and using the expanded colder purified hydrogen first to cool the whole of said impure hydrogen stream in said final exchanger and thereafter to cool the third portion of said impure hydrogen stream in the third of said parallel exchangers.

3. A method as in claim 2 wherein the division of said impure hydrogen stream between said three parallel exchangers is adjusted so that the impure hydrogen received by each exchanger is cooled to substantially the same temperature as that received by each of the other exchangers.

4. A method of purifying by-product hydrogen from a catalytic hydrocarbon dehydro-aromatization process which comprises cooling said by-product hydrogen under super-atmospheric pressure to condense hydrocarbon impurities therefrom and increase the purity thereof, separating cold condensed hydrocarbons from cold purified hydrogen, using said separated cold hydrocarbons to cool impure hydrogen undergoing purification, using a first portion of said cold purified hydrogen to cool impure hydrogen undergoing purification, expanding a second portion of said cold purified hydrogen in a work engine to generate power and to effect further cooling thereof, using the expanded colder second portion to accomplish final cooling of impure hydrogen just prior to separation of condensed hydrocarbons therefrom, thereafter re-compressing part of said second portion at least in part by means of power generated by said expansion, and combining the re-compressed part of said second portion with said first portion.

LUTHER R. HILL.
GREGORY A. VINCENT.
EVERETT W. HOWARD.